United States Patent [19]

Smith

[11] Patent Number: 5,082,234
[45] Date of Patent: Jan. 21, 1992

[54] ROUTER SUPPORT APPARATUS

[76] Inventor: Glen F. Smith, Rte. 4, Box 1932, Athens, Tenn. 37303

[21] Appl. No.: 528,243

[22] Filed: May 24, 1990

[51] Int. Cl.$^5$ ............................................. B23P 23/00
[52] U.S. Cl. ................................... 248/669; 248/674; 248/291
[58] Field of Search .............. 248/669, 674, 125, 121, 248/296, 291, 286, 231.6, 225.31, 230; 144/1 F

[56] References Cited

U.S. PATENT DOCUMENTS

| | | | |
|---|---|---|---|
| 2,157,683 | 5/1939 | Vollrath | 248/669 X |
| 2,368,982 | 2/1945 | Guze | 248/125 X |
| 2,584,310 | 2/1952 | Weinberg | 248/125 |
| 2,673,059 | 3/1954 | Lustig | 248/291 X |
| 2,888,965 | 6/1959 | Phillips | 248/669 X |
| 2,969,949 | 1/1961 | Knight | 248/230 |
| 2,975,647 | 3/1961 | Kurtovich | 248/669 X |
| 3,102,638 | 9/1963 | Saunders | 248/121 X |
| 3,495,795 | 2/1970 | Brown | 248/230 X |
| 4,729,535 | 3/1988 | Frazier et al. | 248/230 |
| 4,779,327 | 10/1988 | Vander Mass | 144/1 F X |
| 4,878,644 | 11/1989 | Downing | 248/674 |

FOREIGN PATENT DOCUMENTS

| | | | |
|---|---|---|---|
| 112676 | 4/1968 | Norway | 248/284 |
| 625693 | 10/1981 | Switzerland | 248/296 |

*Primary Examiner*—Karen J. Chotkowski
*Attorney, Agent, or Firm*—Alan Ruderman

[57] ABSTRACT

Apparatus for supporting a router for use above a work support table has a vertical column secured to beams which are fastened to a wall. A router mounting bracket and a work table mounting bracket are adjustably clamped to the column at selective vertical locations. The router mounting bracket includes a plate on which the base of a router is adapted to be attached, the plate having a circular opening permitting a router tool cutting bit to extend downwardly for engagement with a work piece on a table mounted on the table mounting bracket. The router mounting racket permits the plate to be rotated about the column from an operative position extending away from the wall to an inoperative support position adjacent the wall. A table support brace is carried by the table mounting bracket and may be pivoted from an operative horizontal position downwardly to a vertical inoperative stored position adjacent the column. An accessory table may be mounted on a bracket clamped to the column beneath the table mounting bracket.

10 Claims, 1 Drawing Sheet

ROUTER SUPPORT APPARATUS

BACKGROUND OF THE INVENTION

This invention relates to router supporting and positioning apparatus and more particularly to wall mounted apparatus for supporting a router and a work support platform, the router being supported above the work support platform.

A router is a high speed woodworking tool designed to be hand held for cutting various shapes on the edges of a work piece or for cutting grooves of various cross sectional shapes, e.g., dove tails, etc., through a work piece. The router includes a motor having a vertically oriented shaft on the end of which is mounted a collet and chuck for securing the shank of a cutting tool or bit. The motor is adjustably mounted within a housing having a base and means such as a rack and pinion or helix groove, etc. are provided for moving the motor together with the cutting bit vertically relatively to the base which is designed generally to be disposed on the upper surface of the work piece. Normally, except in the case of plunge routers, the base is positioned on the surface of the work and the cutting bit is adjusted to just touch the work surface to provide a zero setting. The desired depth of cut is then set by adjusting the cutting bit beyond the base relative to the zero setting, a gauge being built into the adjusting means. The motor is then secured by clamping means to the housing and the router may be used to make the required cut. The router motor rotates at exceptionally high speeds, in the order of approximately 20,000 to 25,000 rpm no load speed being typical, and thus provides a smooth cut in the work piece.

One of the difficulties in using a router is that because of the high speed and high torque created thereby the router must be firmly held by the user to prevent it from running away relative to the work piece and from the creation of potentially dangerous situations. Thus, the work must be clamped firmly and unless a bench dog or the like is utilized which grips the work below the surface, the clamps may interfere with the router base and prevent a cut being made in a single pass and requiring reclamping of the work to continue the cut. A solution to this difficulty has been provided by the utilization of router tables wherein the router base is mounted below the surface of the table with the tool bit extending through an aperture in the table, and the work is moved by hand relative to the router. One problem with this arrangement is that it is difficult to adjust the depth of cut, especially when a deep cut is to be made in two or more passes. The router being mounted in inverted fashion relative to its normal disposition provides a situation wherein when the motor is unclamped from the housing to adjust the depth of cut, gravity and the weight of the motor portion of the router acts to decrease the extension of the tool bit relative to the top of the table before the increase in extension can be made. Moreover, it is difficult to read the gauge on the router because of the location of the router beneath the table. Therefore, it generally requires a number of adjustments and trial and error cuts before the correct depth of cut is obtained.

Because of the aforesaid difficulties woodworkers have constantly attempted to devise fixtures and the like for utilizing the router in its normal disposition with the tool bit extending downwardly but mounted so that the work can be moved by hand relative to the router. For example, in Snow U.S. Pat. No. 4,312,391 and North U.S. Pat. No. 4,397,342 proposals are made for mounting a router on a radial arm saw by fixtures attached to the radial arm saw motor housing, and in Vander Maas U.S. Pat. No. 4,779,327 and Downing U.S. Pat. No. 4,878,644 proposals are made for mounting a router on a drill press utilizing the drill press spindle or shaft as a support member to which the router is secured by fixtures. Although such proposals may have some merit not every amateur woodworker has a radial arm saw or a drill press since these stand-alone units require a substantial amount of space and a number of combination units are marketed which combine various features of stand alone units. Additionally, those woodworkers who do have radial arm saws or drill presses may not desire to have them out of commission from their normal use by mounting a router thereon, and if the router were mounted and dismounted whenever the router is needed, the assembly and disassembly time may be substantially more than desired.

SUMMARY OF THE INVENTION

Consequently, it is a primary object of the present invention to provide apparatus for supporting a router above a work table, the router and the table being vertically adjustable relative to each other.

It is another object of the present invention to provide apparatus for supporting a router on a fixed vertical support column above a work table, the router and the table being carried by respective brackets adjustably fastened to the column and permitting vertical adjustment of the router and the table relative to each other.

It is a further object of the present invention to provide apparatus for supporting a router above a work table, the apparatus including a vertical support column adapted to be secured to a wall, the router and table being carried by respective brackets adjustably fastened to the column for relative movement toward and away from each other, the router mounting bracket being pivotable from an operative position about said column to a stowed position adjacent said wall, and said table mounting bracket permitting said table to be pivoted from an operative position to a stowed position parallel to said wall.

Accordingly, the present invention provides wall mounted apparatus for supporting a router and a work support table, the router being mounted above the table and adjustable vertically relative to the table. The apparatus includes a vertical column to which a router mounting bracket is adjustably secured for vertical and pivotable movement relative thereto, and to which a table mounting bracket is adjustably secured for vertical movement relative thereto. The router mounting bracket includes a plate to which the base of a router is adapted to be secured, the plate having a circular aperture permitting the router spindle, chuck and tool cutting bit to extend downwardly toward a work piece mounted on the support table, the bracket further including a clamp remote from the aperture for slidably and pivotably connecting the plate to the column. The table mounting bracket includes a clamp that is slidably connected to the column and includes a pair of spaced apart projections with bolts extending therethrough, the bolts retaining a brace to which the work table is secured and permitting the table to pivot downwardly relative to the table mounting bracket when one of the bolts is removed. The mounting arrangement permits the router bracket and router, and the table to extend outwardly from the wall when in use and to pivot to a stowed position adjacent the wall when not being used, and when in the stowed position displaces a minimal amount of space, extending only approximately ten inches from the wall. Additionally, other table means may be mounted on bracket means secured to the column beneath the work table for storage or the like, and may include means for permitting it to also pivot downwardly to a stowed position parallel and adjacent to the wall.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
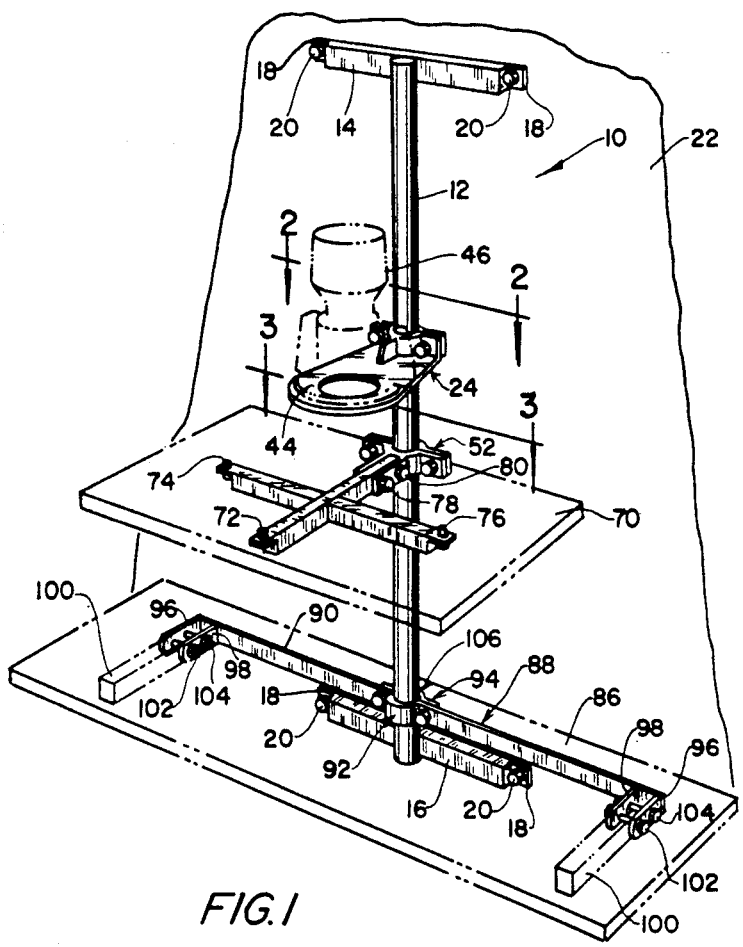
FIG. 1 is a perspective view of the apparatus of the present invention in the operative position, the router, work table and a storage table being illustrated in phantom for purposes of clarity of presentation.

Referring now to the drawings, mounting apparatus generally indicated at 10 constructed in accordance with the present invention comprises a tubular cylindrical column 12 fixedly secured at the top and bottom to the front surface of a respective substantially rectangular beam 14, 16, the column 12 preferably being centrally located relative to the ends of the beams. The beams 14, 16 extend substantially normal to the elongation axis of the column which when mounted as hereinafter described is vertically disposed, the beams having feet 18 at each respective end recessed relative to the front surface of the beam so that the column 12 is spaced forwardly of the plane of the feet. Each of the feet 18 has a bore extending therethrough for receiving screws or the like 20 for securing the beam and thus the column 12 to a workshop wall 22 with the column spaced from the wall by an amount substantially equal to the thickness of the beam, the feet 12 effectively being plates which abut the wall 22. Preferably the column and the beams are constructed from steel and the beams are welded to the column to provide a secure and permanent attachment. In the case of a wall having studs (not illustrated) behind the surface of the wall, the securing screws may be threaded directly into the studs, but if the wall is constructed of concrete or the like in either solid or block form, the screws may be threaded into anchors secured in the wall. The column 12 is thus securely fastened to the wall and spaced therefrom to provide a stable mounting frame for the remainder of the apparatus as hereinafter described.

Figure 2:
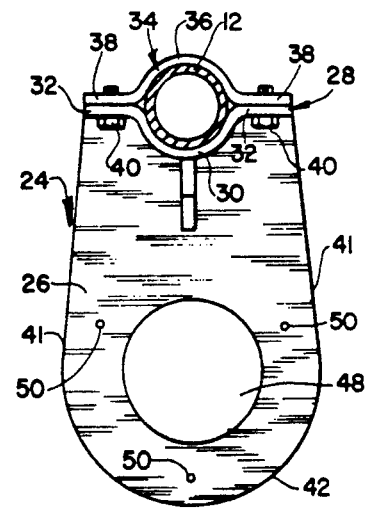
FIG. 2 is a cross sectional view taken substantially along line 2—2 of FIG. 1.

As best illustrated in FIG. 2 a router mounting bracket 24 is clamped about the column 12 beneath the upper beam 14. The bracket 24 comprises a plate member 26 having planar upper and lower surfaces and a clamping wall 28 upstanding at the rear of the plate extending from upper surface, the wall 28 having an arcuate central portion 30 conforming to the shape of the column 12 and a pair of straight laterally extending wings 32. The plate member 26 is positioned so that the central portion 30 abuts the column 12 spaced from the wall 22 and cooperates with a clamp member 34 shaped substantially identically to the wall 28 and also having an arcuate central portion 36 conforming to the contour of the column 12 and a pair of straight laterally extending wings 38. Each wing 32 has a bore aligned with a tapped bore in the corresponding wing 38 and a respective bolt 40 is received through the bores of the wall 28 and threaded into the bores of the member 34 to securely clamp the bracket 24 to the column at a selected vertical disposition. Preferably, the plate 26 and the clamping wall 28 are constructed from steel and the wall is welded to the plate.

The plate 26 is elongated in the direction extending from the wall 28 and includes a pair of side edges 41 extending from the wall and terminating at a circular edge 42 remote from the wall 28, the circular edge portion 42 substantially corresponding to the circular base portion 44 of a conventional router such as illustrated at 46. Formed in the plate 26 spaced from the circular edge 42 and substantially centrally disposed between the side edges 41 is an aperture 48 through which the conventional spindle, chuck and cutting bits of the router may adjustably extend. Disposed about the aperture 48 in the land between the edges 41 and 42 are three holes 50 for receiving a respective screw to secure the base of the router to the plate 26, the screws preferably being those that are normally supplied with and are standard with the router and normally used to mount a smooth surface base plate to the bottom of the base of the router. To mount the router to the bracket 24, the router base plate is removed and the router base is attached directly on the upper surface of the plate 26 with the base plate screws.

Figure 3:
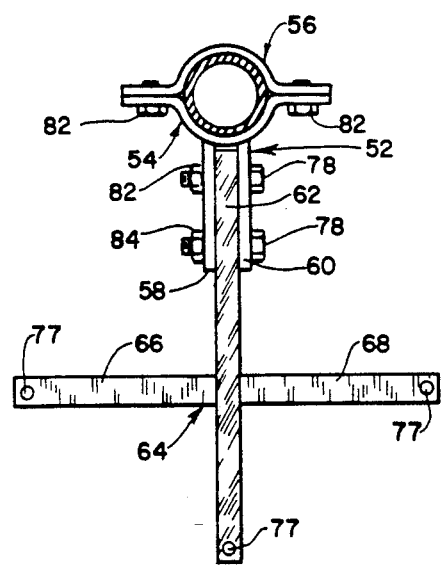
FIG. 3 is a cross sectional view taken substantially along line 3—3 of FIG. 1.
Figure 4:
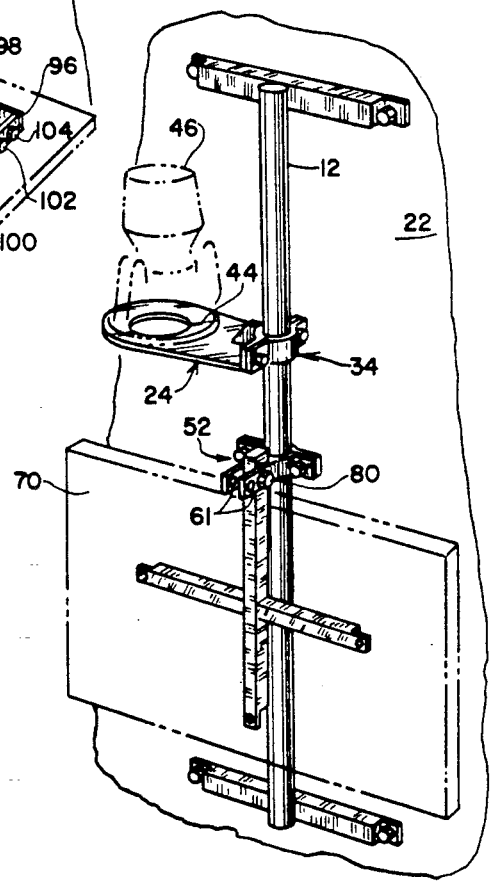
FIG. 4 is a view similar to FIG. 1 but with the storage table removed and the remainder of the apparatus in the stowed position.

Disposed beneath the router mounting bracket 24 is a work table mounting bracket 52. As best illustrated in FIG. 3, the bracket 52 is similar to the bracket 24 in that it includes a clamping wall portion 54 substantially identical to the clamping wall 28, and a clamp member 56 substantially identical to the clamp member 34 for securing the bracket 52 to the column 12, but rather than comprising a plate, the bracket 52 instead comprises a pair of elongated arms 58, 60 extending from the clamping wall portion 54 in parallel spaced apart relationship, each arm having a pair of aligned bores 61 (only two of which are illustrated in FIG. 4). Adapted to be disposed in the space between the arms 58, 60 is one end portion of a leg 62 of a brace 64 comprising the leg 62 and two other legs 66 and 68 secured together, as by welding, into an X or cross configuration. The brace 64 is connected to the bottom of a work table 70 having a planar upper surface by means of screws 72, 74, 76 extending respectively through bores 77 in the end of the leg 62 remote from the arms 58, 60 and the free ends of the legs 66 and 68, and threaded into the lower surface of the work table 70 which preferably is fabricated from wood or a wood composite material. The leg 62 remote from the attachment screw 72 includes a pair of horizontally disposed bores adapted to be aligned with both bores 61 in each leg 58, 60 of the bracket 52, and when so aligned a pair of bolts 78, 80 are inserted through the bores and secure the leg 62 to the arms 58 and 60 by means of respective nuts 82, 84. When so connected to the bracket 52, the work support table 70 may be located at any convenient vertical disposition along the column 12 and clamped by means of bolts 82 extending through bores in the wings of the wall portion 54 and threaded into tapped bores in the wings of the clamp member 56 in a manner substantially identical to the securement of the router mounting bracket to the column 12.

In the initial set-up, the work support table 70 will normally be positioned and secured to the column 12 by means of the bracket 52 before the router bracket 24 so that the table 70 will be in a convenient and comfortable location vertically for the particular user. The router bracket 24, with the router mounted on the plate 26, will then be positioned so that the bottom surface of the plate is a small distance, e.g., ¼ inch, above a work piece that is to be positioned on the table 70 and the router bracket is secured to the column 12. The conventional spindle adjustment mean of the router may then be utilized to extend the cutting bit to the surface of the work for creating the zero setting and the desired depth of cut may thereafter be set by the router adjustment means in conventional fashion. In use, the operator merely activates the router motor and moves the work piece on the table 70 relative to the router cutting bit. If the type of cut to be made requires the need to use a fence, the fence may be clamped to the work table between the location of the cutting bit and the rear edge of the work table so that the fence clamping means does not interfere with the work piece or the hands of the operator.

When the router is not in use, and if it is desired to reduce the spatial displacement used by the mounting apparatus, the bolts 40 may be loosened, and since the clamping wall 30 and the clamp member 34 conform to the circular configuration of the column 12, the router mounting bracket 24 may be rotated substantially 90 degrees relative to its normal operable position as illustrated in FIG. 4. Thus, the bracket 24 together with the router 46 may be pivoted toward the wall 22 to provide a smaller projection of the bracket and the router from the wall 22. Additionally, the nut 84 may be unthreaded from the bolt 78 and the bolt removed from the corresponding bores 61 in the arms 58 and 60 so that the work table 70 may be pivoted downwardly as the leg 62 pivots about the remaining bolt 80 extending through the arms 58, 60 and the legs 62. The upper and lower surface of the work table 70 may then be disposed in a vertical disposition and the extension of the upper work surface of the table 70 from the wall 22 is then only approximately 10 inches. Accordingly, not only does the mounting apparatus provide ease and convenience when performing routing operations, but when not being used, the apparatus displaces a minimal amount of space.

The wall mounted column 12 also permits the mounting of one or more storage or similar convenience tables 86 as illustrated in FIG. 1. For example, a convenience table mounting bracket 88 comprising a laterally extending bar 90 having a centrally disposed clamping wall 92 identical to the clamping walls 30 and 54 of the router bracket and work table bracket 24, 52 respectively, may cooperate with a clamp member 94 identical to the clamp members 34 and 56 to secure the bracket 88 to the column 12 beneath the work table 70. Each end of the bar 90 includes a pair of forwardly extending spaced apart arms 96, 98 similar to the arms 58 and 60 of the work table bracket 52. A convenience table having guide bars 100 secured to the lower surface may be positioned with the guide bars 100 between the respective pair of arms 96, 98 and bolts 102, 104 may secure the guide bars 100 and thus the table 86 to the bracket 88 in a manner similar to the securement of the work table 70 to the bracket 52. If a single table 86 is used a clearance slot 106 will be required in the table if the rear edge of the table is to extend rearwardly of the column 12. If two tables are used, spaced apart at the location of the column, such a clearance slot is not required and each table may be mounted by a respective pair of the arms 96, 98 and the corresponding bolts. If a convenience table is utilized it may be stored, if desired, in the same manner as the work table when not in use.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Apparatus for supporting a router for use above a work support table, said apparatus comprising a cylindrical column, beam means secured to said column, bolt means for securing said beam means to a fixed structural wall of a workshop or the like with said column in a vertical disposition spaced from said wall, a router support bracket including a router support plate and clamping means for adjustably attaching said bracket to said column for vertical movement relative thereto, said clamping means including a clamping wall fixed to and upstanding relative to said plate from one end of said plate, said clamping wall including a substantially centrally disposed arcuate portion conforming to the contour of said column, and a clamp member having a wall including an arcuate portion conforming substantially to the contour of said column, means for securing said clamping wall and said clamp member together about said column with said arcuate portions abutting said column at selected vertical and rotated dispositions spaced from said structural wall, said plate having a circular edge spaced from said clamping wall and means defining an aperture spaced intermediate said edge and said clamping wall, means for fastening a router having a circular base to said plate with a router bit received through said aperture and with a portion of said base overlying said circular edge, a work table mounting bracket including table support means and table clamping means for attaching said table support bracket to said column beneath said router support bracket, said table clamping means comprising a clamping wall including a substantially centrally disposed arcuate portion conforming to the contour of said column and a clamp member having a wall including an arcuate portion conforming to the contour of said column, means for securing together the clamping wall and the clamp member of said table support bracket about said column with the arcuate portions abutting said column at selected vertical and rotated dispositions beneath said router support bracket spaced from said structural wall, said table support means including first means fixed to the clamping wall of said table clamping means and extending from said column remote from said structural wall and second means adapted to be secured to the underside of a work support table, and connecting means for connecting said first and second means together selectively in a horizontal disposition with said second means spaced from said clamping wall and extending away from said column and in a vertical disposition with said second means extending substantially parallel to said column.

2. Apparatus as recited in claim 1, wherein said beam means comprises a pair of spaced apart beams, each beam having a first surface adapted to abut said structural wall and a second surface spaced from said first surface, means for fixedly securing said column to the second surface of each beam, each beam having a pair of feet spaced at opposite sides of said column, said feet comprising a wall recessed from said second surface, and means for securing each of the feet to said structural wall.

3. Apparatus as recited in claim 1, wherein said first means comprises a pair of spaced apart arms, and said second means comprises a brace having a leg positioned between said arms, and said connecting means includes a journal member extending through said arms and said leg and fastened to said arms, and a removable connecting member extending through said arms and said leg when said leg is disposed in a horizontal disposition and removed therefrom to permit said leg to be pivoted about said journal means to a vertical disposition.

4. Apparatus as recited in claim 1, wherein each of said clamping walls includes a pair of substantially planar wall portions extending in opposite directions from the respective arcuate portion, each planar portion having a bore extending therethrough, and each clamp member includes a pair of substantially planar wall portions extending in opposite directions from the respective arcuate portion, each planar wall portion having a bore extending therethrough, the bores in said portion of the clamp members being disposed for alignment with the bores in the respective clamping wall, and bolt means extending through each of the bores in the respective clamping wall and threadedly received within the corresponding bore of the respective clamp member.

5. Apparatus as recited in claim 4, wherein said first means comprises a pair of spaced apart arms, and said second means comprises a brace having a leg positioned between said arms, and said connecting means includes a journal member extending through said arms and said leg and fastened to said arms, and a removable connecting member extending through said arms and said leg when said leg is disposed in a horizontal disposition and removed therefrom to permit said leg to be pivoted about said journal means to a vertical disposition.

6. Apparatus as recited in claim 5, wherein said beam means comprises a pair of spaced apart beams, each beam having a first surface adapted to abut said structural wall and a second surface spaced from said first surface, means for fixedly securing said column to the second surface of each beam, each beam having a pair of feet spaced at opposite sides of said column, said feet comprising a wall recessed from said second surface, and means for securing each of the feet to said structural wall.

7. Apparatus as recited in claim 6, wherein said journal member and said removable connecting member comprise bolt and nut means.

8. Apparatus for supporting a router for use above a work support table, said apparatus comprising an elongated cylindrical column, first and second beams, each beam having first and second spaced apart surfaces, means for securing said column to the first surface of each beam, means for securing the second surface of each beam to a structural wall with said column disposed in a vertical orientation, a router support bracket including a router support plate, clamping means for selectively clamping said router support plate at selected locations along said column, said clamping means including means for permitting said plate to be rotated from an operative position extending remotely from said structural wall to an inoperative position adjacent said structural wall, said support plate having an aperture spaced from said clamping means, means for fastening a router to said plate with a router bit received through said aperture, a work table support bracket including a work table support and table clamping means for selectively clamping said table support means to said column beneath said router support bracket, said table clamping means including means for disposing said table support bracket in an operative horizontal disposition extending from said column and an inoperative vertical disposition substantially parallel to said column, and means for connecting a work table to said table support means.

9. Apparatus as recited in claim 8, including means for clamping an accessory table to said column at selected dispositions beneath said work table support bracket.

10. Apparatus as recited in claim 8, wherein said clamping means and said work table clamping means each include cooperative elements encircling said column and abutting said column in the selected dispositions.

* * * * *